March 26, 1940.　　　R. C. DURANT　　　2,194,973
LOCKING COUPLING
Filed Feb. 7, 1939
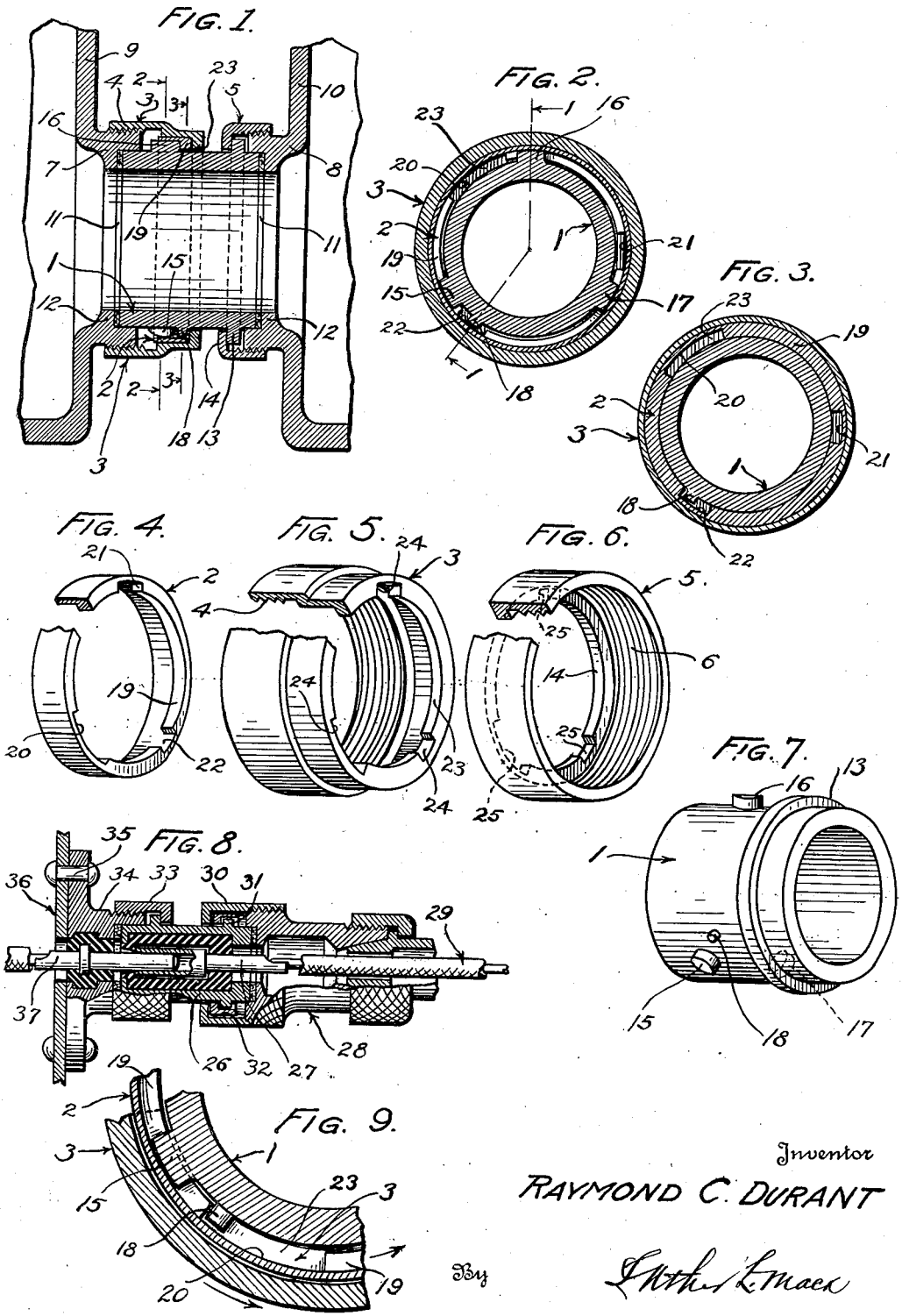
Inventor
RAYMOND C. DURANT Patented Mar. 26, 1940

2,194,973

UNITED STATES PATENT OFFICE 2,194,973

LOCKING COUPLING

Raymond C. Durant, Pasadena, Calif.

Application February 7, 1939, Serial No. 255,076

7 Claims. (Cl. 285—124)

This invention has for an object the provision of an improved coupling device which may be put to many and varied uses in mechanical, electrical, and other fields and will prove superior to coupling devices such as heretofore used in that it may be assembled and disassembled with greater ease and facility, will automatically lock in coupling position, does not necessitate the use of set screws, pins or other fastening devices or small parts which may become broken or lost, and will effectively exclude entrance of water and prevent leakage.

An important provision of this invention is that of making a universal coupling device of but four telescopically fitted annular parts which are constructed and arranged so that they may be quickly assembled and disassembled and will automatically lock in coupled position, but may be readily unlocked when unscrewing the coupling elements and upon axially adjusting certain of the parts, all of said parts being subject to ready removal one from the other for purposes of inspection.

Another object of this invention is to provide a coupling of the character described which, when one of the threaded coupling rings or sleeves thereof, is screwed upon the part or element to which it is to be coupled, will automatically lock the coupling against accidental or unintentional uncoupling or disassembly, said coupling element also bringing about the unlocking and permitting of the disassembly of the structure when unscrewed from the part to which it is coupled.

A further object is to provide a coupling of the character described which may be assembled in small and confined spaces and is ideally suited to such uses in that it will automatically lock in coupled position and does not require the insertion or the setting of set screws or the placement of fastening devices after being coupled.

I have shown a preferred embodiment of my improvements in the accompanying drawing, subject to modification, within the scope of the appended claims, without departing from the spirit of my invention.

Reference is now had to the drawing.

Figure 1 is a sectional view of one embodiment of the coupling of my invention as when used to connect two chambers or tanks, the section being taken on the line 1—1 of Figure 2;

Figure 2 is a sectional view taken on the plane of line 2—2 of Figure 1;

Figure 3 is a sectional view taken on the plane of line 3—3 of Figure 1;

Figure 4 is a fragmentary perspective of the locking or key-ring;

Figure 5 is a fragmentary perspective view of one of the coupling rings or sleeves;

Figure 6 is a fragmentary perspective view of the other coupling ring or sleeve;

Figure 7 is a perspective view of the barrel-like body portion of the coupling device;

Figure 8 is a sectional view of the coupling hereof when used as a cable connector; and Figure 9 is an enlarged fragmentary section taken on the line 3—3 of Figure 1 showing the key-ring in the alternate locking position.

As shown in Figures 1 to 7 inclusive of the accompanying drawing, one form of the coupling device of my invention comprises a hollow cylindrical open-ended body 1, a key-ring 2 surrounding said body, a lock-up coupling sleeve or ring 3 telescopically fitted over the ring 2 and body and having a threaded end 4 and a similar coupling sleeve or ring 5 telescoping said body and having a screw-threaded end 6. The threaded ends 4 and 6 of the sleeves 3 and 5 provide for threaded connection of the device with the parts to be coupled, which parts as here shown are threaded outlets 7 and 8 of two tanks or other vessels 9 and 10.

In accordance with this invention, the parts of the coupling device are especially constructed and arranged so that they may be easily and quickly assembled and disassembled and locked in coupling position and unlocked without the use of special tools, or necessitating the employment of screws or other fastening elements. Moreover, these parts are constructed so that they will exclude the entrance of water into the interior thereof and also prevent leaking when used as a coupling for liquid conduits, pipes, hose, etc., the water-proof and ready take down qualities rendering the coupling adapted to many uses and particularly the connecting electrical cables, conductors, contact members and the like, with one another.

As here shown, the ends of the body portion 1 are adapted to extend into the outlets 7 and 8 so as to engage gaskets 11 seated against internal annular shoulders 12 in said outlets, while the internally threaded ends 4 and 6 of the sleeves or rings 3 and 5 fit over and threadedly engage with said outlets, the sleeves being locked to the body by the means of this invention as will now be described.

Adjacent one end, the body 1 is formed with an annular flange 13 which is adapted to be engaged by a flange 14 on the ring or sleeve 5 when the latter is slipped over the body and moved into the position shown in Figure 1. This axially locks the body to member 10.

Lugs 15, 16 and 17 are formed on the extension of the body 1 intermediate its ends and are circumferentially equidistantly spaced. A smaller lug 18 is provided on said sleeve so as to be disposed to one side and close to the lug 15. These lugs are adapted for cooperation with the key-ring 2, which is substantially flat, like a band, and is provided with an inwardly extending annular flange 19 provided with notches 20, 21, and 22 corresponding in spacing to and adapted to receive the lugs 15, 16 and 17. The notch 20 is larger than the other notches and is adapted to have both lugs 15 and 18 passed therethrough. The lock-up sleeve 3 is provided with an inwardly extending annular flange 23 having notches 24 corresponding in size and location to the notches in the ring 3 and in this connection it is seen that the flange 14 is provided with notches 25 corresponding to those in the rings 2 and 3. These notches in the flanges 14 and 23 permit of the axial movement of the members 3 and 5 past the lugs on the body member in assembling and disassembling the coupling. The flange 23 on the lock-up ring 3 is adapted to engage the outer face of the flange 19 of the key-ring 2 whereby to lock the ring 3 on the body 1, the key-ring having first been moved axially into position such that it is locked on the body 1.

In assembling the coupling preparatory for use, the ring or sleeve 5 is slipped over the body 1 and moved axially thereof to position such that the flange 14 thereof will abut the flange 13 on said body, as shown in Figure 1, the notches 25 in the flange 14 permitting the ring 5 to be moved past the lugs 15, 16, 17, and 18 on the body.

Next, the key-ring 2 is positioned, flanged end first, within the ring or sleeve 3 and when the flanges 19 and 23 are engaged, said key-ring is manually adjusted to bring the larger notch 20 thereof into registration with the corresponding notch in the flange 23 and the smaller notches 21 and 22 in registry with the corresponding smaller notches of the flange 23. With the rings 2 and 3 thus arranged, said rings are slipped over the body 1 so that the two lugs 15 and 18 will pass through the larger notches and the lugs 16 and 17 will pass through the other notches. The purpose is to dispose the flange 19 of the key-ring 2 behind the lugs 15, 16, and 17 and the flange 23 of the sleeve 3 behind the flange 19 whereby to prevent axial movement of said rings relative to the body such as would disassemble the coupling.

Upon now turning the lock-up ring or sleeve 3 as though to screw the same upon a fitting such as the one 7 here shown, the ring 2 will be turned due to frictional contact with the sleeve 3 and the notches 20, 21, and 22 of the ring 2 will be disposed to one side of the lugs 15, 16, and 17. When the ring 2 is turned through part of a revolution as aforesaid and shifted slightly axially of the body, the small lug 18 which is rearward of the adjacent lug 15, will slip into the small notch 21. This small lug in striking the ends of the small notch 21 will prevent the ring 2 from turning in either direction such as would permit the notches therein to come into alinement with the lugs 15, 16, and 17. Thus the key-ring is locked against turning and axial movement on the body 1 and when the lock-up sleeve or ring 3 is screwed in place the flange 23 thereof in engaging the flange 19 on the ring 2 will hold the ring 2 firmly against the lugs and against axial movement as would be necessary to move the small lug 18 out of the notch 21. It is seen that the ring 5 may be screwed onto the member 8 without turning the body and so as to tightly clamp the coupling in place. These rings 3 and 5 bring the coupled parts 9 and 10 together so that the gaskets are tensioned and a leak proof joint is insured.

To disassemble the coupling, the lock-up ring 3 is unscrewed so as to space the flange 23 thereof from the lock-up ring 2 and upon moving the lock-up ring axially as permitted by this spacing, the small notch 21 is moved clear of the small lug 18 wherein the ring 2 is free to be turned into position such that the notches therein will register with said lugs and permit removal of the rings 2 and 3 from the body 1.

In instances where the close spacing of the parts 3 and 5 or other parts will not permit of the axial adjustment of the ring 2 as necessary to engage and lock the small lug 18 in one of the small notches 21 and 22, said ring 2 will automatically be held against turning when the small lug 18 encounters the end of the large notch 20, in response to the turning of ring 3 in a screwing-on direction. This is brought about by the fact that the lugs 15, 16 and 17 are axially spaced from lug 18, such that when the ring 2 is turned in one direction sufficiently to move the notches therein to one side of the lugs 15, 16, and 17, the small lug 18 will still be positioned in the large notch 20, so as to contact one end of said notch whereby to prevent rotation of ring 2 while the screwing-on rotation of ring 3 is continued as necessary. When thus locked, the coupling may be unlocked upon unscrewing the ring 3 and thereby rotating the ring 2 to a position such that the notches 20, 21, and 22 come opposite the lugs 15 and 18, 16, and 17, respectively.

It is now seen that the coupling hereof is operable to automatically lock the parts thereof in coupled relation, either by rotating and axially shifting the ring 2 until the notch 21 or the notch 22 receives the small lug 18 therein or by merely rotating the ring, without axial shift thereof, sufficiently to move the notches 20, 21, and 22 to one side of the lugs 15, 16, 17 while the lug 18 remains in the notch 20 so as to prevent turning of the ring 2 in one direction.

It will now be apparent that the coupling hereof may be readily and easily assembled and disassembled and in view of the manner in which the parts may be fitted one upon the other and lockingly retained in place, no screws, pins, or other fastening elements are necessary to maintain the coupling effectively locked. Moreover, no special tools are required to unlock the structure.

As shown in Figure 8, the coupling hereof is employed as a cable connector. In this form of the invention, the body portion 26 is in the form of an elongated barrel having an insulation core adapted to contain elements 27 of a cable connector, this member 26 being secured to the end fitting 28 of a cable 29 by means of the lock-up ring 30 which corresponds to the lock-up ring 3. The body 26 is provided with lugs 31 which are identical with those in the first described form of the invention and is also provided with a key-ring 32 identical with the one 2. The other coupling ring 33 which corresponds to the one 5 in the first described form of the invention is adapted to be screwed upon a socket member 34 which is fixed as at 35 to a support 36. This socket member is adapted to contain the corresponding unit 37 of the cable connector so that when the body 26 is inserted into the socket 34 the elements 27 and 37 will engage with one another and be locked in such engagement by reason of the key-ring 32 and its associated elements. The coupling in this form is identical as to construction with the one shown in Figure 1 except as to proportion and adaptation. The purpose of this disclosure is to point out the adaptability of the coupling to use as a connector for an electrical, conductors, contacts, etc. The coupling is particularly adapted for this purpose inasmuch as it provides for quick and easy assembling and disassembling so that the parts may be inspected from time to time to meet government regulations concerning such devices and because of the fact that it is waterproof and does not require the use of set screws, pins, or other fastening devices and contains no minute parts which may become broken or lost.

What I claim as new is:

1. A locking coupling device including a body member provided with peripheral abutments, a flanged coupling ring surrounding said body and having the flange thereof engaged with one of the abutments on the body, said ring being screw-threaded and adapted for threaded connection with a part to be coupled, a key-ring rotatably mounted upon said body and having a flange provided with notches for reception of abutments on said body, said notches being arranged so that when the flange of said key-ring is engaged behind certain of said abutments, the key-ring will be held against axial movement on said body in one direction, and another of said abutments will engage in one of the notches whereby to prevent rotation of said ring relative to said body, and another screw-threaded coupling ring rotatably mounted upon the body and surrounding said key-ring and having a flange adapted to engage behind said key-ring.

2. A locking coupling device including a body member provided with peripheral abutments, a flanged coupling ring surrounding said body and having the flange thereof engaged with one of the abutments on the body, said ring being screw-threaded and adapted for threaded connection with a part to be coupled, a key-ring rotatably mounted upon said body and having a flange provided with notches for reception of abutments on said body, said notches being arranged so that when the flange of said key-ring is engaged behind certain of said abutments, the key-ring will be held against axial movement on said body in one direction, and another of said abutments will engage in one of the notches whereby to prevent rotation of said ring relative to said body, and another screw-threaded coupling ring rotatably mounted upon the body and surrounding said key-ring and having a flange adapted to engage behind said key-ring, said flanges of said coupling rings being provided with notches corresponding to the notches in the flange of said key-ring and which permit of the axial movement of said coupling rings past certain of said abutments upon the mounting and the removal of said rings.

3. A self-locking coupling device comprising a body portion, a coupling ring surrounding said body portion and being rotatably and axially movable relative thereto and provided with screw-threads whereby it may be coupled to a threaded member, a key-ring rotatably and axially movable on said body and adapted to be disposed within said coupling ring and to be rotated when the latter is rotated by frictional contact therewith, a flange on said coupling ring adapted to engage said key-ring to prevent relative axial movement of said body and coupling ring in one direction, and means embodied in the construction of said key-ring and body portion for automatically locking said key-ring against rotation and also against axial movement in one direction when said coupling ring is rotated a predetermined extent in a direction for screwing the same on said threaded member, whereby to lock said coupling ring and body portion together, said last-named means automatically releasing said key-ring for rotation and axial movement when said coupling ring is rotated for unscrewing same.

4. A self-locking coupling device comprising a body having peripheral abutments spaced apart both circumferentially and axially thereof, a key-ring rotatable and axially movable on said body and having notches spaced circumferentially in accordance with the circumferential spacing of said abutments and adapted to have said abutments pass therethrough upon axial movement of said ring relative to said body, said key-ring being arranged to engage certain of said abutments to prevent axial movement of said ring in one direction on said body when the ring is rotated to move the notches therein out of alinement with said certain abutments, one of said notches being arranged to receive one of the abutments to prevent rotation of said ring when the latter has been rotated and disposed in said abutting relation to said abutments, and a coupling sleeve rotatable on said body and encompassing said ring and having means providing for connection thereof with a part to be coupled thereto, and a flange on said coupling sleeve adapted to engage said ring to prevent axial removal of said sleeve from said body.

5. A self-locking coupling device comprising a body having peripheral abutments spaced apart circumferentially thereof, a key-ring rotatable and axially movable on said body and having abutment receiving notches spaced circumferentially in accordance with the circumferential spacing of said abutments, means on said ring being arranged to engage abutments on the body to prevent axial movement of said ring in one direction when the ring is rotated to move notches therein out of alinement with abutments on the body, one of said notches being arranged to receive one of the abutments to prevent rotation of said ring when the latter has been rotated and disposed in said abutting relation to other abutments on the body, and a coupling sleeve rotatable on said body and encompassing said ring and having means providing for connection thereof with a part to be coupled thereto, and a flange on said coupling sleeve adapted to engage said ring to prevent axial removal of said sleeve from said body.

6. A self-locking coupling device comprising a body having peripheral abutments spaced apart both circumferentially and axially thereof, a key-ring rotatable and axially movable on said body and having notches spaced circumferentially in accordance with the circumferential spacing of said abutments and adapted to have said abutments pass therethrough upon axial movement of said ring relative to said body, said key-ring being arranged to engage certain of said abutments to prevent axial movement of said ring in one direction on said body when the ring is rotated to move the notches therein out of alinement with said certain abutments, one of said notches being arranged to receive one of the abutments to prevent rotation of said ring when the latter has been rotated and disposed in said abutting relation to said abutments, and a coupling sleeve rotatable on said body and encompassing said ring and having means providing for connection thereof with a part to be coupled thereto, a flange on said coupling sleeve adapted to engage said ring to prevent axial removal of said sleeve from said body, said flange of said sleeve having notches therein corresponding to those in said ring.

7. A self-locking coupling device including a body member, a coupling sleeve rotatably surrounding and being removable from said body, means embodied in said sleeve for effecting a coupling and uncoupling thereof with respect to another member upon rotative movement of the sleeve in opposite directions, a key-ring surrounding and being removable from said body member, said ring being positioned between said sleeve and said body and adapted to engage said sleeve to prevent removal thereof from said body, and means embodied in the construction of said ring and said body and operating responsive to the coupling and uncoupling movements of said sleeve to respectively lock the ring against removal from said body and release the ring whereby both the ring and the sleeve may be removed from the body.

RAYMOND C. DURANT.